United States Patent Office 3,430,123
Patented Feb. 25, 1969

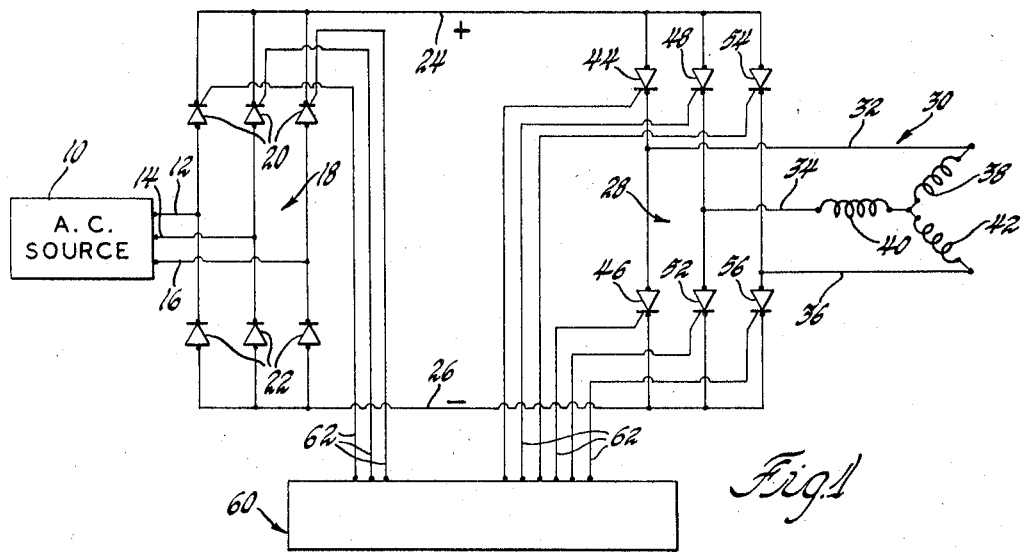
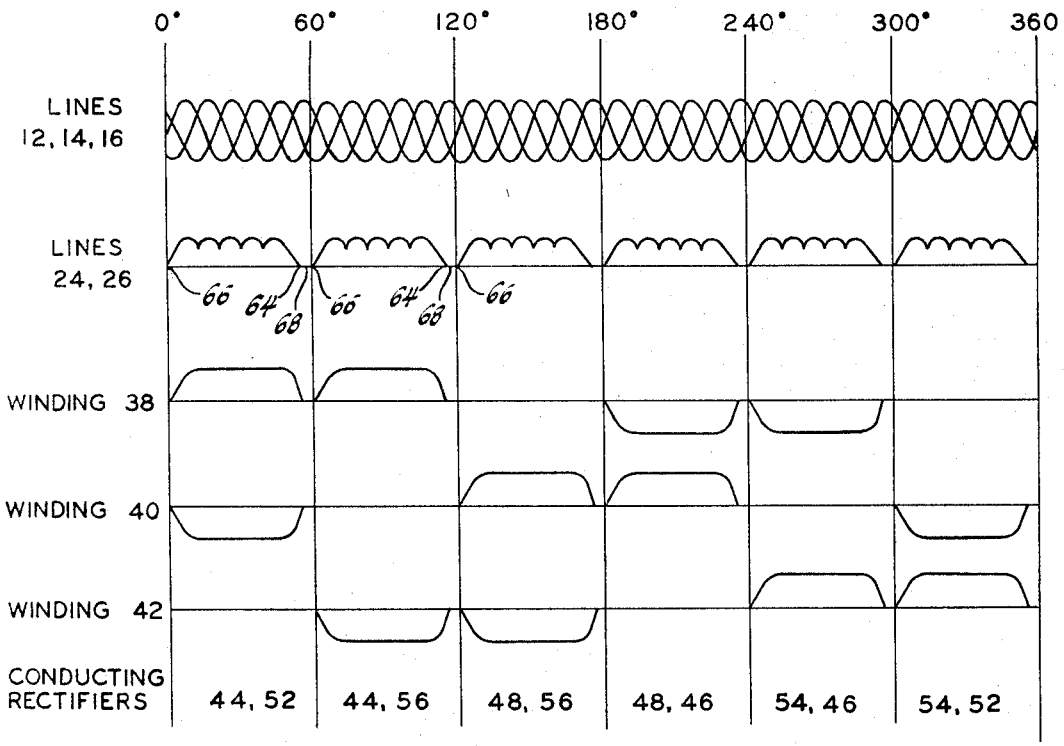

3,430,123
RECTIFIER-INVERTER MOTOR POWER SUPPLY
Thomas M. Corry, Goleta, and George J. Spix, Santa Barbara, Calif., assignors to General Motors Corporation, Detroit, Mich., a corporation of Delaware
Filed Nov. 3, 1966, Ser. No. 591,768
U.S. Cl. 318—227                5 Claims
Int. Cl. H02p 1/26, 5/40, 7/00

This invention relates to an electrical motor power supply and, more particularly, to a vehicle motor power supply including a combined rectifier-inverter circuit for converting high frequency sinusoidal current to controlled alternating current pulses.

In vehicle AC electric motor drive systems power is limited by weight of the power supply or generating systems. It has been found that weight limitations can be avoided by using high speed prime movers such as turbine engines and high speed AC generators reaching frequencies of 3000 c.p.s. to 4000 c.p.s. Since the AC motors used to drive the vehicle operate at much lower frequencies and also must be controlled, a circuit arrangement is required to convert the higher and substantially constant generator output frequencies.

Therefore, this invention comprises a motor supply circuit including a commutating rectifier circuit and an inverter circuit combination using controlled rectifiers of the silicon type which are well known and include large current conducting capacities. The commutating rectifier circuit supplies DC power to the inverter circuit which, in turn, supplies pulsating AC current to the motor under control of a gating circuit. Since controlled rectifiers have characteristics similar to a thyratron tube, they continue conducting after a gating signal has been removed and are extinguished only by reversing or removing the voltage from across the controlled rectifier devices. It is well known to provide separate commutating circuits to extinguish controlled rectifiers, but the additional circuitry adds weight and complexity. The circuit of this invention provides natural commutation after the controlled rectifiers of the inverter are triggered to conduction by controlling the output of the commutating-rectifier circuit to periodically interrupt the power applied to the inverter from the commutating rectifier circuit. The advantages of AC to DC conversion and DC to AC conversion are combined and utilized in a circuit having a minimum of controlled rectifier elements in an AC to AC motor power supply.

Accordingly, one of the objects of this invention is to provide a motor power supply wherein only power conducting controlled rectifier devices are utilized in a commutating-rectifier and inverter circuit combination without commutating circuit networks to supply controlled AC motor current.

A further object of this invention is to provide a motor power supply with a multiphase rectifier bridge of semiconductor controlled rectifiers supplying direct current power to an inverter circuit having semiconductor controlled rectifiers which are rendered non-conductive at predetermined intervals when the rectifier bridge output is interrupted.

Another object of this invention is to provide a motor power supply for a vehicle electric drive motor that converts three-phase alternating current from a high speed generator to a controlled frequency supplied to the vehicle motor which includes controlled rectifiers in a commutating-rectifier bridge circuit that are commutated by the generator AC current and a controlled-rectifier inverter circuit wherein controlled rectifiers are extinguished during periodic intervals when DC power is interrupted in the commutating-rectifier circuit.

A still further object of this invention is to provide a motor power supply for a vehicle drive motor which includes a commutating-rectifier having both semiconductor controlled rectifiers and conventional diodes, a three-phase inverter with semiconductor controlled rectifiers and a rectifier control circuit providing means for controlling the commutating-rectifier current and three-phase inverter power pulses.

Other objects and advantages will appear from consideration of the specification and claims taken in conjunction with the drawings in which:

FIGURE 1 is a schematic diagram of a motor power supply made in accordance with this invention.

FIGURE 2 is a graph illustrating the operation of FIGURE 1.

Referring now to the drawings and, more particularly, to FIGURE 1 wherein 10 indicates a source of AC current which may be an alternator or other type of power supply preferably providing three-phase current. The output terminals 12, 14 and 16 of the power source 10 are connected to a commutating-rectifier circuit 18 including a three-phase rectifier bridge having controlled rectifier devices 20 and conventional power diodes 22. The DC output from the commutating-rectifier 18 is supplied through power leads 24 and 26 to the inverter bridge circuit 28. The inverter circuit 28 supplies three-phase power pulses to alternating current motor 30 through power leads 32, 34 and 36. The motor 30 shown is a polyphase squirrel cage induction motor having star-connected stator windings 38, 40 and 42 although a three phase synchronous motor can be supplied as well as an induction motor.

Power supply leads 12, 14 and 16 are each connected to the junction of a series connected controlled rectifier device 20 and power diode 22. The three series connected pairs are arranged in parallel with the positive power lead 24 connected to the cathodes of controlled rectifiers 20 and negative power lead 26 connected to the anodes of power diodes 22.

Inverter circuit 28 includes pairs of series connected controlled rectifiers 44–46, 48–52 and 54–56 which are connected in parallel to form a three-phase inverter bridge arrangement. The positive lead 24 is connected to the anodes of controlled rectifiers 44, 48 and 54 and the negative lead 26 to the cathodes of controlled rectifiers 46, 52 and 56. Power output leads 32, 34 and 36 are shown respectively connected at each junction of the series connected inverter devices.

The semiconductor controlled rectifier devices 20 and 44 through 56 of the rectifier bridge circuit 18 and inverter circuit 28, respectively, are preferably of the silicon controlled rectifier type which are capable of conducting high power currents and are well known in the art. As noted above, once a silicon controlled rectifier is triggered to conduction, the control electrode loses control of the controlled rectifier and it continues conduction until the voltage across the cathode and anode is removed or reversed. A control means 60 supplies gating signals through control leads 62 to each control electrode of the controlled rectifiers of circuits 18 and 28 to initiate conduction. The trigger and gating circuits within control means 60 include known sources of controllable periodic pulses such as relaxation oscillator circuits which do not form a part of this invention.

When gating signals are applied to the controlled rectifiers of the commutating-rectifier 18, one phase of input AC current in the forward conducting direction will flow through one controlled rectifier 20 and one of the power diodes 22 not in series with the conducting controlled rectifier until the phase current reverses polarity. As the current through the one conducting controlled rectifier 20 reverses direction, it is extinguished since the phase current is blocked by diode blocking action. The next phase current occurring in the forward or positive direction will be conducted through a second combination including a controlled rectifier and diode and the cycle is repeated. Normally, only one controlled rectifier and one diode is conducting at any instant. The gating signals may be applied either sequentially or simultaneously to the controlled rectifiers 20 to provide the rectified DC current. Satisfactory results are obtained in applying gating signals simultaneously to all the controlled rectifiers of commutating rectifier 18 and then periodically removing them. When gating signals are interrupted, the last conducting controlled rectifier 20 will extinguish and no power will be supplied to inverter 28 until the gating signals are reapplied. The provision of interrupted rectified current commutates the controlled rectifiers of the inverter circuit 28 as is explained further below. It has been found that the rectified DC power at the leads 24 and 26 includes approximately 4% voltage ripple when connected to a high speed AC generator with frequencies in the range of 3000 c.p.s. to 4000 c.p.s., and filtering is unnecessary.

Gating signals from the rectifier control means 60 are also applied to the controlled rectifiers 44 through 56 in inverter circuit 28. The controlled rectifiers 44 through 56 are sequentially triggered to provide the desired frequency for the AC power that is applied to the motor 30. In the circuit shown, controlled rectifiers are gated to conduction in predetermined combinations including different pairs of controlled rectifiers. An inverter power path may be traced from positive lead 24 through one controlled rectifier, for example 44, through two phase windings of the motor, through a second controlled rectifier, for example 52, and back to the negative lead 26. The gating signals trigger the controlled rectifiers in such a manner that inverter output power is provided as single step three-phase current pulses also explained further hereinbelow.

Operation of the circuit of FIGURE 1 is more clearly understood from the graphs of FIGURE 2. The graphs of FIGURE 2 show a complete 360° cycle of current supplied from the output of inverter 28 to the motor windings. Alternating current supplied to the motor consists of 120° single step pulses, disclosed in copending application Ser. No. 295,954 filed on July 18, 1963, assigned to the same assignee as this application, now Patent No. 3,323,032, although in the circuit of the present invention pulses are interrupted at 60° intervals by the commutating-rectifier. The sequency of pulses is provided by gating the controlled rectifiers of the inverter 28 according to the table shown at the bottom of FIGURE 2. The top graph shows the three-phase power conducted by leads 12, 14 and 16 to the input of commutating-rectifier circuit 18. The positive half cycle of each phase is conducted through one controlled rectifier 20 which is gated to conduction from rectifier control means 60. A conducting controlled rectifier continues to conduct the input phase current until the start of the negative half cycle at which time the reverse polarity extinguishes the controlled rectifier. Since each of the three input phases are displaced 120° apart, the commutating-rectifier controlled rectifiers are each rendered conductive at times displaced by 120° and then respectively commutated or extinguished during the negative portion of each phase of input current.

When gating signals are not applied from control means 60 to the controlled rectifier 20, current on leads 24 and 26 from the last conducting controlled rectifier falls to zero as shown at 64. The gating signals are reapplied at 66 and positive going current is conducted through the commutating rectifier to repeat the cycle at a rate controlled by control means 60 that is substantially less than the frequency of source 10. The DC power across leads 24 and 26 then includes power interruptions or gaps 68. These gaps accordingly remove power from the inverter circuit 28 input and thereby extinguish any conducting controlled rectifiers.

The frequency of occurrence of gaps 68 is established with respect to the frequency desired to be supplied from the power supply to the motor 30 and are timed to occur every 60°. It is understood that the width of gaps 68 may be varied but are dependent upon minimum extinguishing time characteristics of the controlled rectifiers. Accordingly, the controlled rectifiers of both the circuits 18 and 28 are extinguished in the manner described without any external commutation being provided.

The inverter circuit 28 is sequentially trigged to supply a three-phase current to the motor windings 38, 40 and 42 as shown in FIGURE 2. The table at the bottom of FIGURE 2 indicates the gating sequence of inverter controlled rectifiers to supply the different phases of power pulses to the motor 30. At the time DC power supplied from the commutating-rectifier is interrupted, every 60° to commutate the inverter controlled rectifiers, a different pair combination of controlled rectifiers is gated as indicated. The current to each motor winding is of one polarity for approximately 120° and then the opposite polarity for approximately 120° after an interval of approximately 60°. Also, the current in each phase of the motor will include the gaps of interrupted power supplied from the commutating rectifier 18. It is apparent that the gating signals to the inverter circuit may be delayed from the point 66 to decrease motor power.

While the preferred embodiment of the present invention is herein disclosed, it is understood that other forms may be adopted. For example, the particular sequence and duration of gating pulses applied to the commutating-rectifier and inverter circuits may be varied to change the amount, frequency and sequence of output current and thereby control the speed and torque of motor 30.

We claim:

1. A power supply for a three-phase motor comprising; a three-phase self-commutating rectifier bridge means having three controlled rectifiers and three diodes with the input of said rectifier means connected to receive a three-phase current, an inverter means connected to the output of said rectifier means, said inverter means having three parallel circuits each including a pair of series connected controlled rectifiers providing a frequency controlled three-phase output current, and a control means operatively connected to both said rectifier bridge means and said inverter means providing first control signals to said controlled rectifiers of said rectifier bridge means, said first control signals from said control means to said controlled rectifiers of said rectifier bridge means rendering said rectifier bridge means operative following an inoperative time interval wherein current is removed from the rectifier bridge means output, said control means providing second control signals following each time interval wherein said rectifier bridge means is inoperative, said second control signals being periodically applied to different preselected pairs of controlled rectifiers in said inverter means for supplying periodically interrupted pulses of three-phase alternating current from said inverter means.

2. An electric motor drive system for a vehicle comprising; an alternating current drive motor means, a source of alternating current to supply power for said motor means, a rectifier circuit means including a controlled rectifier means connected to said alternating current source, a source of first input control signals connected to the gates of said controlled rectifier means and supplying gating signals to the controlled rectifiers of said rectifier means, said gating signals periodically gating the controlled rectifier means so that the rectifier circuit means provides a direct current power signal that is periodically interrupted when said gating signals are terminated, an inverter means connected to said rectifier circuit means output, said inverter means including pairs of series connected controlled rectifiers with the series pairs being parallel connected in a bridge arrangement, a second source of input control signals connected to the gates of said controlled rectifiers of said inverter means and supplying to the controlled rectifiers of said inverter means signals in a predetermined sequence to supply a multiphase inverter current to said motor means, the current being supplied to said motor means having a frequency directly related to the frequency at which said interruptions occur in the rectified direct current.

3. The electric motor drive for a vehicle of claim 2 wherein said rectifier means includes a commutating-rectifier circuit having parallel connected series circuits each including a silicon controlled rectifier element and a power diode element, each junction of said serial arranged elements providing an input from said high frequency source, said commutating-rectifier circuit having a pair of output terminals connected across said parallel connected series circuits to supply the direct current power signal to said inverter means, and said inverter means includes a three-phase inverter bridge circuit.

4. The electric motor drive circuit of claim 3 wherein said commutating inverter includes three of said series circuits and said three-phase inverter bridge circuit includes three parallel pairs of series connected silicon controlled rectifier elements connected across said direct current terminals.

5. An electric motor drive system for a vehicle of claim 2 wherein said drive motor means includes a three-phase squirrel cage induction motor having star-connected stator windings and the current supplied from said inverter to each of said windings includes a 360° power cycle having alternate polarity power pulses occurring during separate 120° periods of said power cycle with said direct current power signal interruptions occurring every 60° of the power cycle.

References Cited

UNITED STATES PATENTS

| | | | |
|---|---|---|---|
| 3,109,976 | 11/1963 | Sichling | 321—4 |
| 3,262,036 | 7/1966 | Clarke et al. | 318—230 |
| 3,273,041 | 9/1966 | Strohmeier et al. | 321—4 |
| 3,354,370 | 11/1967 | Corry et al. | 318—227 |

BENJAMIN DOBECK, *Primary Examiner.*

GENE RUBINSON, *Assistant Examiner.*

U.S. Cl. X.R.

318—231; 321—4, 5, 45